No. 813,603. PATENTED FEB. 27, 1906.
G. M. WASHINGTON.
BALING PRESS.
APPLICATION FILED SEPT. 5, 1905.
3 SHEETS—SHEET 1.
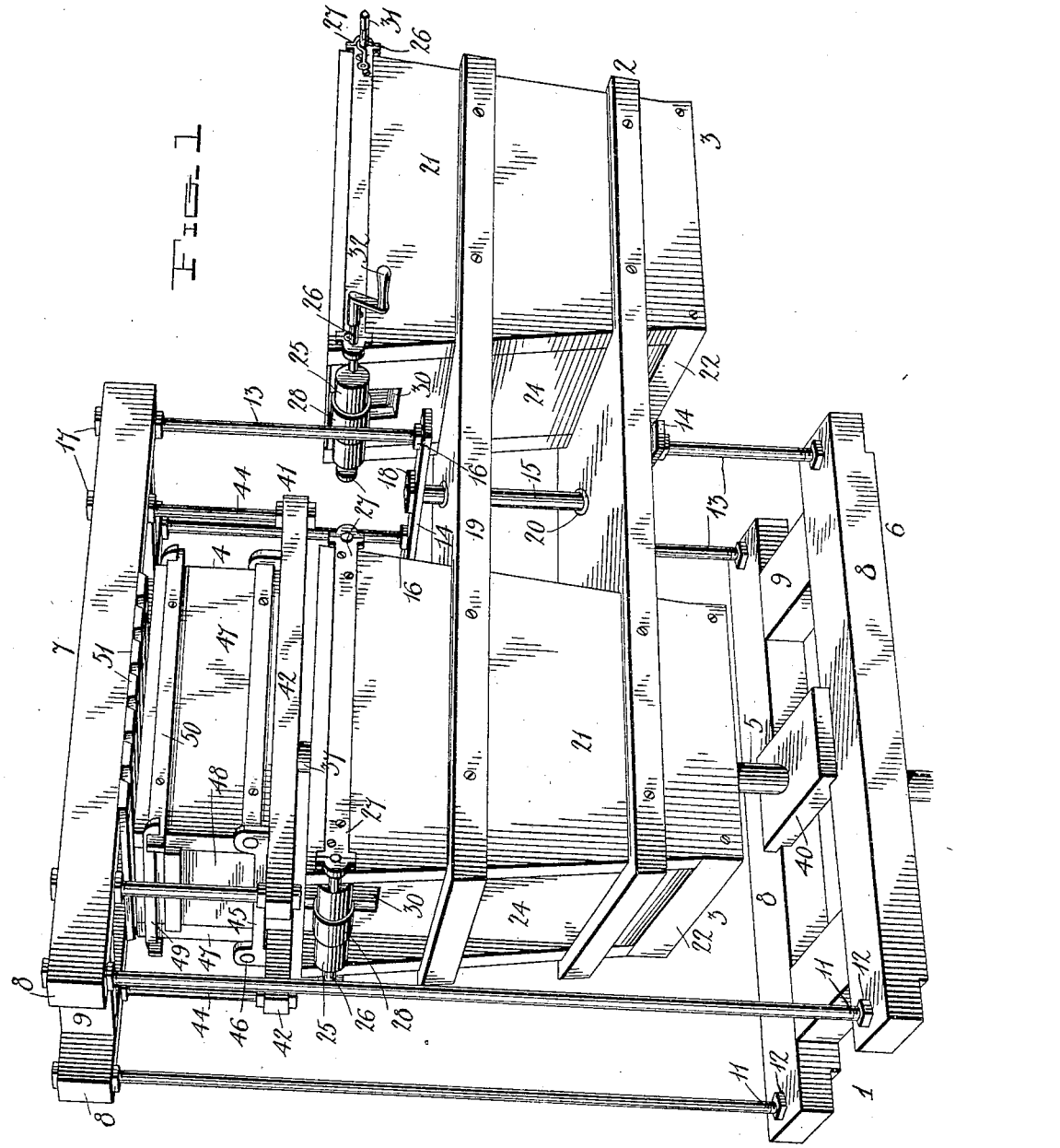
Witnesses
Inventor
George M. Washington
by H. B. Willson
Attorney

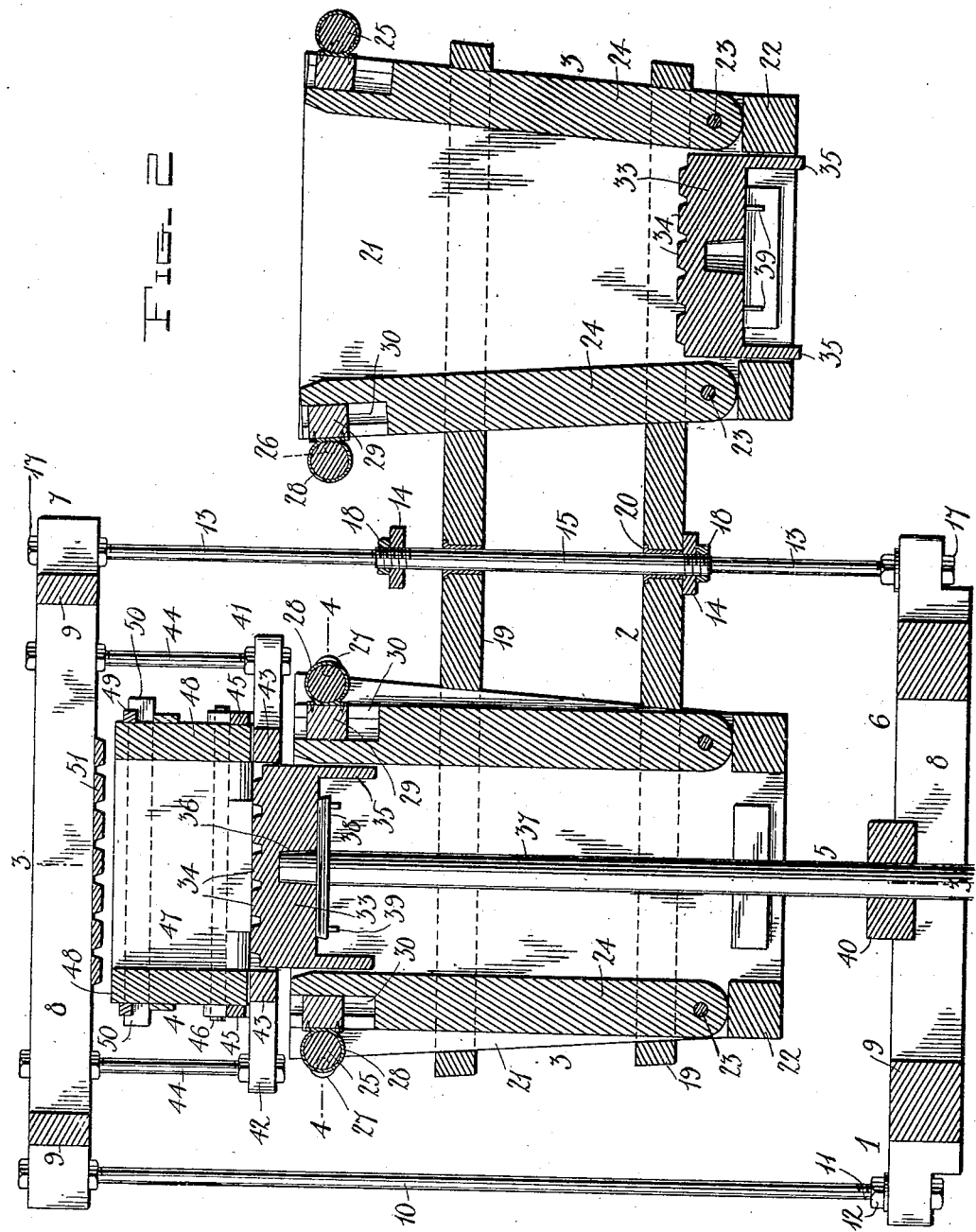

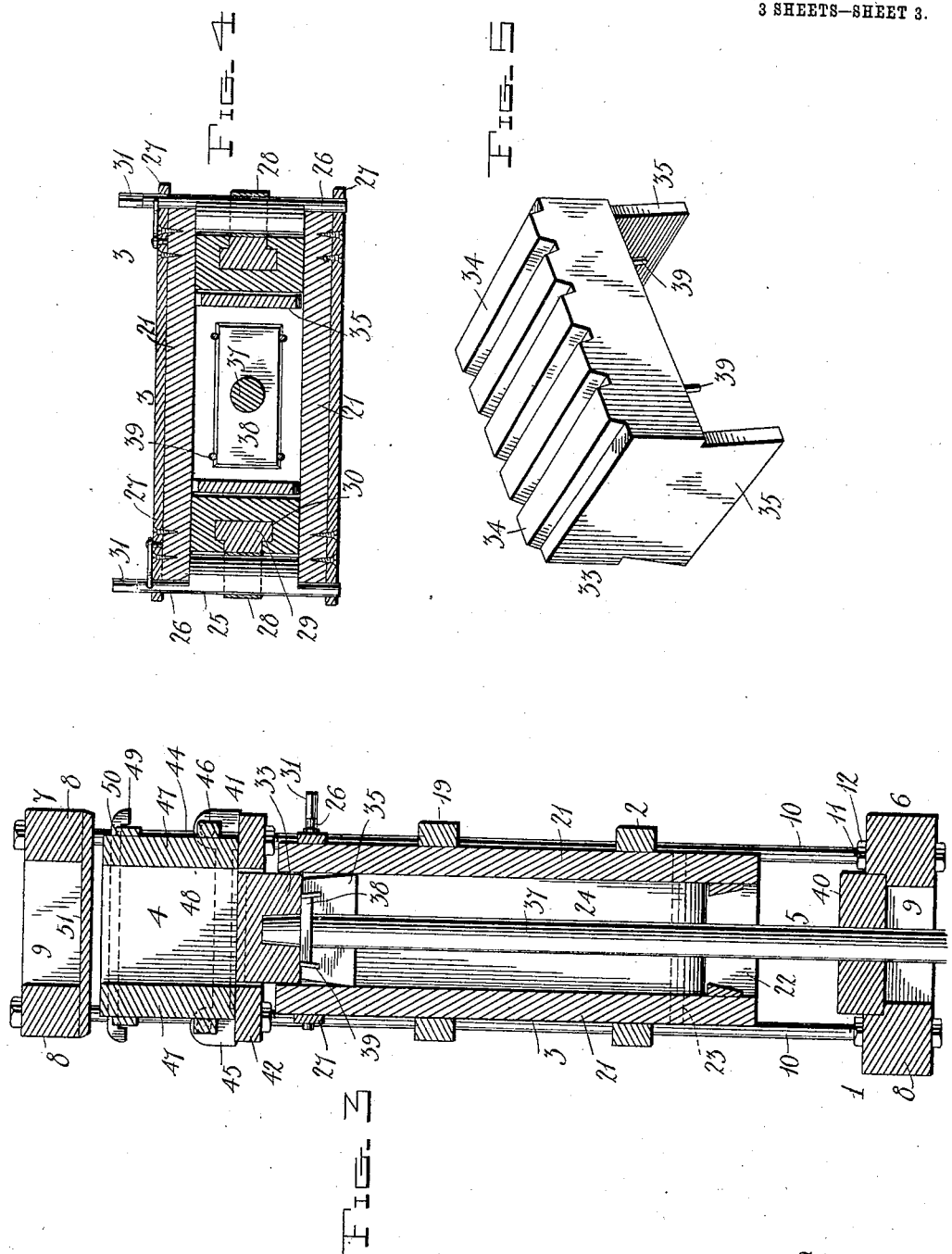

UNITED STATES PATENT OFFICE.

GEORGE M. WASHINGTON, OF HOUSTON, TEXAS.

BALING-PRESS.

No. 813,603.  Specification of Letters Patent.  Patented Feb. 27, 1906.

Application filed September 5, 1905. Serial No. 277,032.

*To all whom it may concern:*

Be it known that I, GEORGE M. WASHINGTON, a citizen of the United States, residing at Houston, in the county of Harris and State of Texas, have invented certain new and useful Improvements in Baling-Presses; and I do declare the following to be a full, clear, and exact description of the invention, such as will enable others skilled in the art to which it appertains to make and use the same.

My invention relates to improvements in presses for baling cotton and the like; and it consists in the novel construction, combination, and arrangement of parts herein shown and described.

The object of the invention is to improve and simplify the construction and operation of machines of this character, and thereby render the same more efficient and durable in use and less expensive to manufacture.

The above and other objects, which will appear as the nature of my invention is better understood, are accomplished by means of the construction illustrated in the accompanying drawings, in which—

Figure 1 is a perspective view of my improved baling-press. Fig. 2 is a vertical longitudinal sectional view through the same. Fig. 3 is a vertical transverse sectional view taken on the line 3 3 in Fig. 2. Fig. 4 is a detail horizontal sectional view taken on the line 4 4 in Fig. 2, and Fig. 5 is a perspective view of the movable bottom of one of the feeding boxes or hoppers.

Referring to the drawings by numeral, 1 denotes the main frame or support of the press, in one side of which is mounted a swinging frame 2, carrying one or more feeding boxes or hoppers 3, which are adapted to be successively swung into the frame 1 between the bale box or mold 4, mounted in the top of the frame 1, and a plunger or ram 5, mounted in the bottom of the said frame 1. The latter comprises a bottom 6 and a top 7, each of which is formed of parallel longitudinal beams 8, connected by cross blocks or beams 9. The top 7 is connected to and supported above the bottom 8 at one of its ends by a pair of vertical rods 10, which have their screw-threaded ends 11 passed through openings formed in the ends of the beams 9 and secured therein by nuts 12, as clearly shown in Fig. 2 of the drawings. At the opposite end of the frame 1 the top 7 is supported by a frame consisting of four rods 3, which project from the ends of the beams 8 and are secured to parallel transversely-disposed plates 14, which latter are in turn connected at their centers by a rod 15, which is adapted to serve as the pivot for the swinging hopper-carrying frame 2. Each of the rods 13 has one of its ends screwed into a threaded opening in one of the plates 14 and locked therein by a jam-nut 16, and its opposite end is screw-threaded and passed through an opening in the end of one of the beams 8, with nuts 17 on said threaded portion above and below said beam. The centrally-disposed pivot-rod 15 has its screw-threaded ends passed through centrally-disposed alining openings in the plates 14 and engaged with nuts 18, which when tightened are adapted to draw the plates 14 together and hold the parts rigid.

The swinging hopper-carrying frame 2 comprises two parallel horizontally-disposed beams 19, in the ends of which are secured the vertically-disposed hoppers or feed-boxes 3. The pivot-rod 15 extends through the center of each of the beams 19, and a metallic sleeve or bushing 20 is preferably provided to reduce wear. The frame 2 may be of any other form, so that a greater or less number of the boxes or hoppers 3 may be mounted thereon, so that each one may be successively swung to an operative position between the bale-box 4 and the plunger 5.

The feed boxes or hoppers 3 are identical in construction, and each comprises two vertically-disposed parallel sides 21, which are rigidly secured to the beams 19, and have their lower ends connected by blocks 22. Between the sides 21, immediately above the blocks 22, are pivotally mounted, as shown at 23, swinging sides 24. These sides 24 are pivoted at their lower ends, so that their upper ends will swing toward and from each other between the sides 21, which latter are broader at their upper ends than at their lower ends. In order to actuate the swinging ends 24, I provide upon the upper portions of the sides 21 cams or eccentrics 25. The latter are in the form of cylindrical rolls secured eccentrically on shafts 26, which are journaled in bearing-plates 27, secured upon the outer faces of the sides 21, as shown. Each of the rolls 26 is surrounded by a strap 28, secured upon a sliding block 29, mounted in a guide-groove 30 in the outer and upper portion of the end 24. The shafts 26 may be rotated in any desired manner; but I preferably provide one or both of their ends with polygonal-shaped portions 31, which are adapted to be engaged by a removable crank-handle 32. It will be seen that when said cams or eccentrics are operated the ends 24 will be moved toward or from the centers of the box or boxes owing to the engagement of the straps 28 with the eccentrics 25 and the slides 29 with the grooves 30. The upper and lower ends of the boxes or hoppers 3 are open, and slidably mounted between the sides and ends of the same is a movable bottom or follower 33. The latter has a slotted or corrugated top 34 and depending flanges 35 at each end, said flanges serving to guide the bottom or follower between the ends 24. In the block or body portion of the follower 33 is formed a socket or recess 36, which is adapted to receive the upper end of the rod 37 of the plunger or ram 5. Said rod 37 has adjacent to said end a rectangular plate or block 38, which is adapted to fit between depending guide pins or studs 39, provided upon the under side of the bottom or follower 33, as clearly shown in Fig. 5 of the drawings. The rod 37 of the plunger or ram 5 reciprocates through a block 40, mounted upon the beams 8 of the bottom 6 and may be operated by any suitable mechanism. (Not illustrated.)

The bale box or mold 6 is supported by a frame 41, which depends from the top 7 of the main frame 1 and comprises longitudinal beams 42, connected by cross-beams 43 and supported by hanger-rods 44, which latter have their screw-threaded ends passed through and secured in openings in the beams 42 and the beams 8 of the top 7, as shown. Upon the top of the beams 14 are secured cross-bars 45, between the ends of which are pivoted, as shown at 46, the sides 47 of the bale-box 4. This construction permits said sides 47 to be swung outwardly away from the ends 48 of the bale-box. Said ends 48, which are removable, are supported upon the cross-bars 43 and are adapted to be clamped between the sides 47 by locking-bars 49, which have their offset ends engaged with notched straps or rods 50, secured on the outer faces of the sides 48. The top of the bale-box 4 is formed by a series of slats 51, secured upon the under side of the beams 8 of the top 7, and the bottom of the same is formed by the movable bottoms or followers 33 in the boxes or hoppers 3.

The operation of the baling-press will be as follows: The cotton or other material to be baled is placed in one of the hoppers 3 when it is in a position without the frame 1, and its ends 24 are swung outwardly. After the desired quantity has been placed in said hoppers the eccentrics 26 are operated to move the ends 24 inwardly, so that the space between them corresponds to the length of the bale-box 4. The plunger or ram 5 being in its lowered position, the full hopper 3 is swung around until its open end is disposed directly beneath the bale-box 4, and the plunger or ram 5 is then operated or moved upwardly, so that it elevates the sliding bottom or follower 33 of said hopper and compresses the cotton or other material above the same within the bale-box 4. When this compression is done, the bale may be wired and then removed by removing the locking-strips 49 to permit the sides 47 of said box to be swung outwardly and downwardly.

Various changes in the form, proportion, and the minor details of construction may be resorted to without departing from the principle or sacrificing any of the advantages of this invention.

Having thus described my invention, what I claim as new, and desire to secure by Letters Patent, is—

1. The combination of a main frame or support, a horizontally-swinging frame therein, a hopper upon said swinging frame, adjustable sides or ends in said hopper, a sliding bottom in said hopper, a bale-box mounted in the upper portion of said main frame, and a plunger mounted in the lower portion of said main frame and adapted to operate the movable bottom in said hopper to compress the contents of the latter in said bale-box, substantially as described.

2. In a baling-press, the combination of a main frame consisting of top and bottom portions, rods projecting from said portions, plates or bars connecting said rods, a pivot-rod connecting said plates and a swinging hopper-carrying frame upon said pivot-rod, substantially as described.

3. In a baling-press, the combination of a main frame comprising top and bottom portions connected at one end, rods projecting from the opposite end of said portions, parallel bars connecting said rods, a centrally-disposed pivot-rod connecting said bars, a frame pivoted upon said pivot-rod, a feed box or hopper upon said pivoted frame, a bale-box suspended from the top portion of the main frame and a plunger mounted in the bottom portion of said main frame, substantially as described.

4. In a baling-press, the combination of a main frame having a base and a top, each consisting of longitudinal beams connected by cross-bars, rods connecting said longitudinal beams at one end, rods projecting from said beams at their other ends, bars connecting the last-mentioned rods, a pivot-rod connecting said bars, a horizontally-swinging frame pivoted upon said pivot-rod, feeding boxes or hoppers mounted upon said swinging frame, swinging ends in said hoppers, sliding bottom in said hoppers, a frame depending from the top of said main frame, a baling-box mounted upon said depending frame and having movable sides and ends, and a plunger mounted in the bottom of said main frame, substantially as described.

5. In a baling-press, the combination with a baling-box and a plunger, of a feeding box or hopper having a swinging wall formed with a groove, a slide in said groove, an eccentric-strap upon said slide, and an eccentric extending through said strap and journaled upon said hopper, substantially as described.

6. In a baling-press, a feeding box or hopper comprising side walls, end walls pivotally mounted between said side walls and formed with grooves, sliding blocks mounted in said grooves, eccentric-straps connected to said blocks, brackets upon said side walls, shafts journaled in said brackets, eccentrics upon said shafts and mounted in said straps, and means for rotating said shafts, substantially as described.

7. In a baling-press, a feeding box or hopper having a swinging wall, an eccentric mounted upon said hopper, and an eccentric-strap engaged with said eccentric and with said swinging wall, substantially as described.

In testimony whereof I have hereunto set my hand in presence of two subscribing witnesses.

GEORGE $\overset{\text{his}}{\underset{\text{mark}}{\times}}$ M. WASHINGTON.

Witnesses:
  O. C. MILLARD,
  J. R. ROBERSON.